United States Patent
Ramanujam et al.

(10) Patent No.: US 9,148,298 B2
(45) Date of Patent: Sep. 29, 2015

(54) ASYMMETRIC RING TOPOLOGY FOR REDUCED LATENCY IN ON-CHIP RING NETWORKS

(75) Inventors: Rohit Sunkam Ramanujam, Santa Clara, CA (US); Sailesh Kumar, San Jose, CA (US); William Lynch, Los Altos, CA (US)

(73) Assignee: Futurewei Technologies, Inc., Plano, TX (US)

( * ) Notice: Subject to any disclaimer, the term of this patent is extended or adjusted under 35 U.S.C. 154(b) by 886 days.

(21) Appl. No.: 13/285,733

(22) Filed: Oct. 31, 2011

(65) Prior Publication Data

US 2012/0201171 A1  Aug. 9, 2012

Related U.S. Application Data

(60) Provisional application No. 61/439,229, filed on Feb. 3, 2011.

(51) Int. Cl.
 H04L 12/28 (2006.01)
 H04L 12/42 (2006.01)
 G06F 15/78 (2006.01)
 H04L 12/40 (2006.01)
 H04J 1/16 (2006.01)

(52) U.S. Cl.
 CPC ............ H04L 12/42 (2013.01); G06F 15/7825 (2013.01); H04L 12/40189 (2013.01); *Y02B 60/1207* (2013.01); *Y02B 60/1225* (2013.01)

(58) Field of Classification Search
 CPC ........ H04L 12/42; H04L 12/437; H04L 41/12

USPC .......................................... 370/230, 254, 258
See application file for complete search history.

(56) References Cited

U.S. PATENT DOCUMENTS

| | | | |
|---|---|---|---|
| 7,680,032 | B1 | 3/2010 | Pheiffer et al. |
| 2006/0080461 | A1* | 4/2006 | Wilcox et al. ............... 709/238 |
| 2007/0153708 | A1 | 7/2007 | Dominick et al. |
| 2009/0323704 | A1 | 12/2009 | Hall et al. |
| 2010/0223505 | A1 | 9/2010 | Andreev et al. |
| 2011/0069610 | A1* | 3/2011 | Zelig et al. .................. 370/222 |
| 2012/0044811 | A1* | 2/2012 | White et al. ................. 370/238 |

FOREIGN PATENT DOCUMENTS

CN            101035023 A      9/2007

OTHER PUBLICATIONS

Foreign Communication From a Counterpart Application, PCT Application No. PCT/CN2012/070873, International Search Report dated Apr. 19, 2012, 7 pages.
Foreign Communication From a Counterpart Application, PCT Application No. PCT/CN2012/070873, Written Opinion dated Apr. 19, 2012, 4 pages.

(Continued)

*Primary Examiner* — John Pezzlo
(74) *Attorney, Agent, or Firm* — Conley Rose, P.C.; Grant Rodolph; Wiliam H. Dietrich

(57) ABSTRACT

An apparatus comprising a chip comprising a plurality of nodes, a first plurality of links connecting the plurality of nodes in a first ring network having a first topology, and a second plurality of links connecting the plurality of nodes in a second ring network having a second topology, wherein the first topology is different than the second topology.

18 Claims, 4 Drawing Sheets

(56) References Cited

OTHER PUBLICATIONS

Foreign Communication From a Counterpart Application, European Application No. 12742529.6, Extended European Search Report dated Jan. 14, 2014, 10 pages.

Joo-Young, K., et al., "A 118.4 GB/s Multi-Casting Network-on-Chip with Hierarchical Star-Ring Combined Topology for Real-Time Object Recognition," IEEE Journal of Solid-State Circuits, IEEE Service Center, vol. 45, No. 7, XP011312126, Jul. 1, 2010, pp. 1399-1409.

Koibuchi, M., et al., "A Lightweight Fault-Tolerant Mechanism for Network-on-Chip," Second ACM/IEEE International Symposium on Networks-On-Chip, NOCS, XP031244541, Apr. 7, 2008, pp. 13-22.

Morgan, A., et al., "Multi-Objective Optimization of NoC Standard Architectures Using Genetic Algorithms," 2010 IEEE International Symposium on Signal Processing and Information Technology (ISSPIT), XP031912797, Dec. 15, 2010, pp. 85-90.

Nikitin, N., et al., "Physical-Aware Link Allocation and Route Assignment for Chip Multiprocessing," 2010 Fourth ACM/IEEE International Symposium on Networks-on-Chip (NOCS), XP031707259, May 3. 2010, pp. 125-134.

Palermo, G., et al., "Mapping and Topology Customization Approaches for Application-Specific STNoC Designs," IEEE International Conference on Application-Specific Systems, Architectures and Processors, XP031226479, Jul. 9, 2007, pp. 61-68.

Shafiee, A., et al., "Congestion Resistant Routing Algorithm for Congestion Resistant Ring Road Network on Chip," 2010 Fifth International Conference on Digital Telecommunications, XP032079631, Jun. 13, 2010, pp. 17-21.

Zafar, B., et al., "Cubic Ring Networks: A Polymorphic Topology for Network-on-Chip," 2010 39th International Conference on Parallel Processing (ICPP), Sep. 13, 2010, XP031773727, pp. 443-452.

Peh, L., et al., "Filt-Reservation Flow Control," High-Performance Computer Architecture, Jan. 8, 2000, pp. 73-84.

Foreign Communication From a Counterpart Application, European Application No. 12742529.6, European Office Action dated Apr. 9, 2015, 10 pages.

* cited by examiner

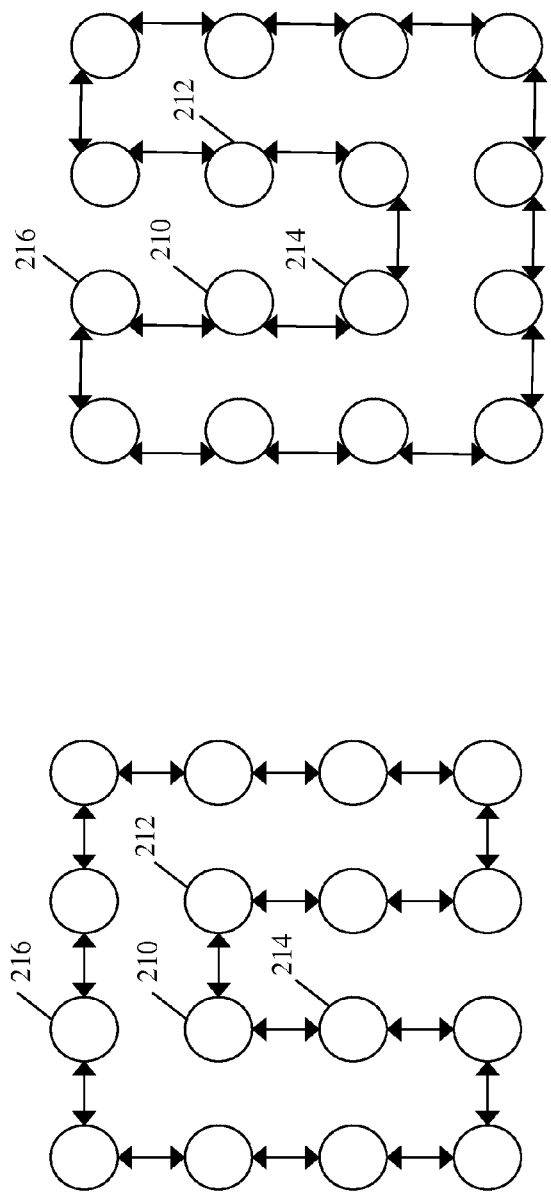
FIG. 2A
FIG. 2B
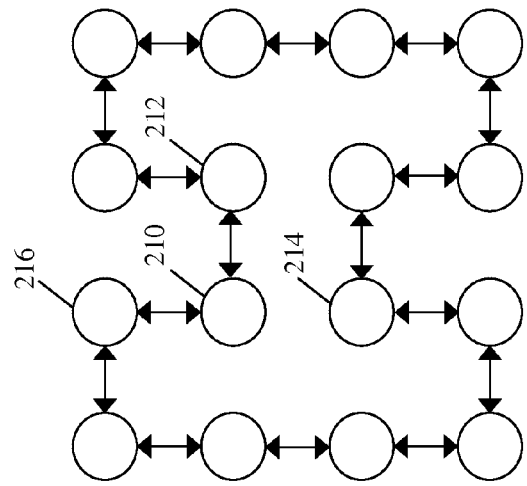
FIG. 2C
FIG. 2D

ASYMMETRIC RING TOPOLOGY FOR REDUCED LATENCY IN ON-CHIP RING NETWORKS

CROSS-REFERENCE TO RELATED APPLICATIONS

The present application claims priority to U.S. Provisional Patent Application 61/439,229, filed Feb. 3, 2011 by Rohit Sunkam Ramanujam, et al., and entitled "Asymmetric Ring Topology for Reduced Latency in On-Chip Ring Networks," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

As transistor and other component sizes become smaller and manufacturing techniques continue to improve, more functionality is being placed on single integrated circuits, or chips. The term system on a chip (SoC) generally refers to integrating all the functionality of a computer or other complex electronic systems onto a single chip. A SoC may comprise one or more memories, processors, or input/output ports, all integrated into a single chip. One way of allowing various components of a SoC to communicate is to use an on-chip network, sometimes referred to as a network-on-chip. An on-chip network is intended to replace conventional ways of communicating between electronic components in a complex system, such as conventional bus and crossbar interconnections.

Various topologies have been considered for on-chip networks, and ring topologies are sometimes used because of the relative simplicity of the routers that may be employed. For example, in a unidirectional ring network each router comprises two ports, one input port for receiving data from a first adjacent router and one output port for transmitting data to a second adjacent router. These routers occupy less area, consume less power, and can be clocked at higher frequencies compared to higher-radix on-chip routers, such as routers in mesh networks. However, ring networks may not scale well as the number of routers increases. This is because the average and worst-case packet bandwidth increase linearly with the number of routers. Network latency may be critical for a number of SoC applications that require ultra low latency communication and operate under tight power budgets.

SUMMARY

Disclosed herein is an apparatus comprising a chip comprising a plurality of nodes, a first plurality of links connecting the plurality of nodes in a first ring network having a first topology, and a second plurality of links connecting the plurality of nodes in a second ring network having a second topology, wherein the first topology is different than the second topology.

Also disclosed herein is a method comprising determining at a first node that a first ring network from among a plurality of ring networks interconnecting a plurality of nodes contains a shortest path from the first node to a second node; and transmitting a first flit from the first node to the second node over the first ring network, wherein the plurality of nodes includes the first node and the second node, and wherein the ring networks are asymmetric with respect to each other.

Also disclosed herein is an apparatus comprising a chip comprising a plurality of nodes, a first plurality of links connecting the plurality of nodes in a first ring network, and a second plurality of links connecting the plurality of nodes in a second ring network, wherein a first node in the plurality of nodes is configured to determine which of the first ring network and the second ring network includes a shortest path from the first node to a second node and to selectively transmit a first flit over the first ring network or the second ring network based on the determination, wherein the first ring network and the second ring network form asymmetric ring networks.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIGS. 2A, 2B, 2C, and 2D are schematic diagrams of embodiments of sixteen nodes interconnected in different ring networks.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Disclosed herein are asymmetric ring topologies and methods of routing therein. Asymmetric ring topologies, also referred to as asymmetric ring networks, use more than two rings routed through a given set of nodes in an asymmetric manner, so that a given set of nodes may be connected in different orders resulting in a network comprising different ring networks. Asymmetric ring networks may combine advantages of conventional ring networks while at the same time may result in reduced latency and higher throughput compared with conventional ring networks, thereby improving system performance. Asymmetric ring networks may be attractive for on-chip networks.

Figure 1:
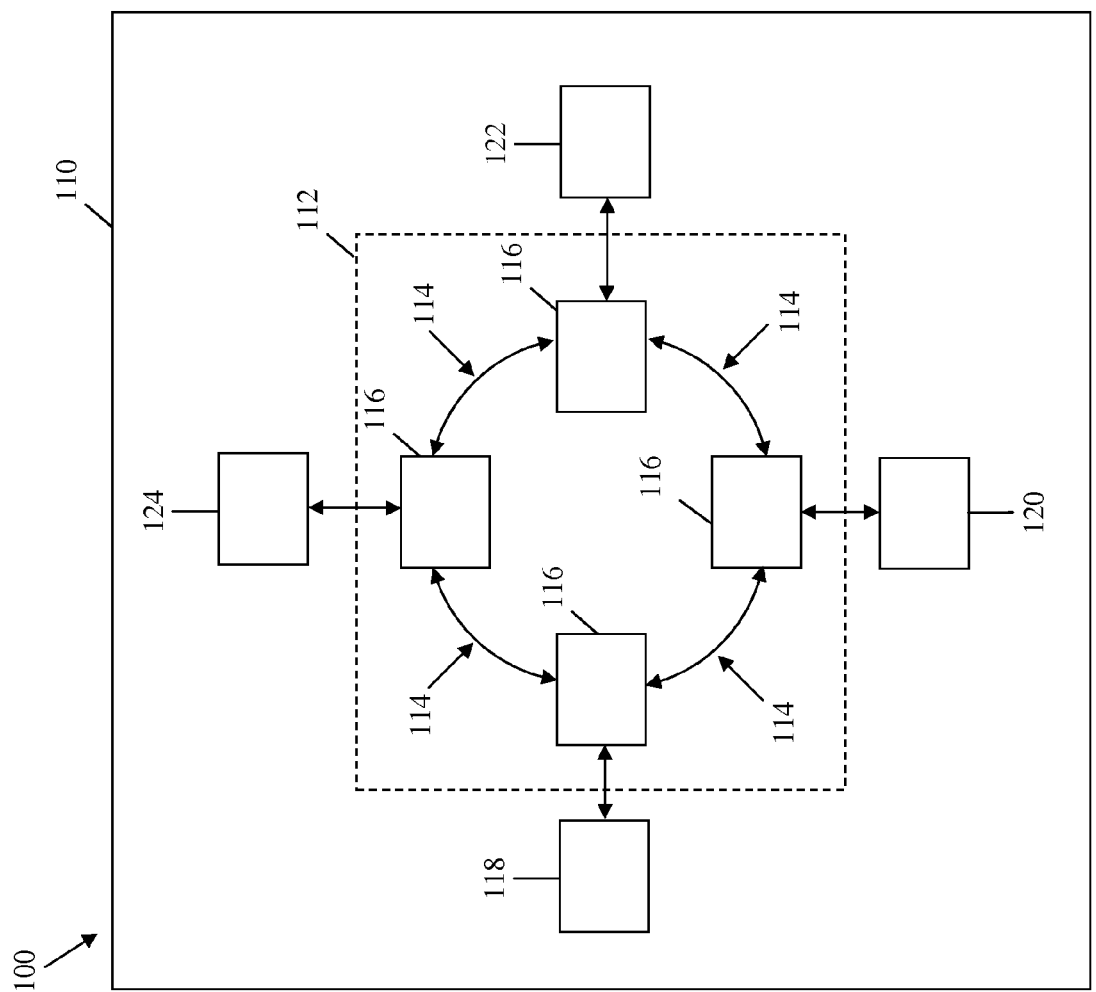
FIG. 1 is a schematic diagram of an embodiment of a system on a chip.

An on-chip network may be configured to provide communication capability between various components that reside in a single chip. FIG. 1 is a schematic diagram of an embodiment of a system on a chip (SoC) 100 with an on-chip network 112. Specifically, the SoC 100 comprises an on-chip network 112 comprising a plurality of nodes 116. The on-chip network 112 may be configured to provide communications capability between components 118, 120, 122, and 124 via the nodes 116, where the on-chip network 112 and components 118, 120, 122, and 124 are located on a single chip 110. While four components 118, 120, 122, and 124 are illustrated in FIG. 1, it will be appreciated that an on-chip network 112 may connect any number and/or type of components 118, 120, 122, and 124. Further, although FIG. 1 shows four nodes 116, an on-chip network 112 may comprise any number of links 114 and nodes 116.

The links 114 and nodes 116 in on-chip network 112 may be arranged in any topology. For example, the links 114 and nodes 116 may be arranged in a ring topology, which may also be referred to as a ring network, as illustrated in FIG. 1. A ring network may refer to a network topology in which each node connects to exactly two other nodes. As another example, the links 114 and nodes 116 may be arranged in a mesh topology, which may also be referred to as a mesh network. A mesh network may refer to a network topology in which one or more nodes are directly connected to more than two other nodes.

The links 114 may be any devices that carry flits between nodes 116 and/or components 118, 120, 122, and 124. The links 114 are typically electrical links, but may be optical or wireless links. Although links 114 are generally bidirectional, the links 114 instead may be unidirectional. At least some of the links 114 may be divided into a plurality of virtual channels by, for example, segmenting available link 114 resources (e.g. time and/or frequency) into a plurality of slots (e.g. time slots and/or frequency slots) that carry the flits. A virtual channel may extend between only two adjacent nodes or may extend through multiple nodes.

The nodes 116 may be any devices that promote routing of flits within the on-chip network 112. At least some of the nodes may break an incoming packet (e.g. an Internet Protocol (IP) packet or Ethernet frame) into units of information known as flow control digits, or flits, if such is not done by the components 118, 120, 122, and 124, and/or reassemble the flits into an outgoing packet if such is not done by the components 118, 120, 122, and 124. In addition, the nodes 116 may perform flit routing in that they receive flits and determine which of a plurality of virtual channels on which to transmit the flits and/or which of a plurality of routes on which to transmit the flits. In a similar manner, the nodes 116 may perform packet routing in that they receive packets and determine which of a plurality of virtual channels on which to transmit the packets and/or which of a plurality of routes to transmit the packets. As part of the routing, the nodes 116 may arbitrate two flits or flits competing for a common resource (e.g. a virtual channel in a link 114).

To perform its various functions, each node 116 may include a processor that is in communication with a memory, such as a read only memory (ROM), a random access memory (RAM), or any other type of memory. Each processor may be a general-purpose processor or may be an application-specific processor. Alternatively, at least some of the nodes 116 may be implemented with no local memory, but have access to an external memory that may be located on another part of the SoC 100 and perhaps shared by other nodes 116. Finally, at least some of the nodes 116 may be implemented with no local memory and no memory access.

A bidirectional ring network, such as illustrated in FIG. 1, may be implemented as two unidirectional ring networks that connect nodes in the same order but transmit flits in opposite directions. For bidirectional ring networks, each node 116 may include two routers, one for each unidirectional ring network making up the bidirectional ring network. Each router may include one input port and one output port and may be clocked at a high frequency due to the relatively simple implementation of such routers.

As discussed above, flits may be formed by segmenting packets, e.g., IP packets or Ethernet frames, that enter an on-chip network. A flit that enters an on-chip network may also be referred to as being injected into an on-chip network. Referring to FIG. 1 as an exemplary example, a component, such as component 122, may transmit a packet to corresponding node 116. A node in which a flit enters an on-chip network may be referred to as a source or source node, and a node where a flit exits an on-chip network may be referred to as a destination or destination node.

Node 116 may be configured to receive the packet and segment the packet into smaller units of information. Alternatively, a component, such as 122, may segment a packet into smaller units. Each unit of information may be placed into a flit. There may be different types of flits, such as head flits, body flits, and tail flits. A packet that is segmented into smaller units may be distributed over a head flit, one or more body flits, and a tail flit, and these flits may maintain a specified order (e.g. head first, then body, then tail) as they are routed and/or processed on the chip 110. A head flit may be used to acquire resources in an on-chip network for the series of flits corresponding to a packet, and a tail flit may be used to release resources. A head flit may also comprise the packet's header (e.g. the packet's destination address, source address, etc.), and may contain some of the packet payload, whereas the body and tail flits generally do not contain any of the packet's header. In cases where the packet's header is particularly long, the packet's header may be included in the head flit and some of the body flits, but not the remaining body flits or the tail flit. Any scheme for assigning information to flits is within the scope of this application. Further, on-chip networks that transmit and receive packets, in addition to or instead of flits, are also within the scope of this application. For convenience, the remainder of the application addresses flits, but the application is also applicable to packets.

The components 118, 120, 122, and 124 may be any type of devices that process the flits. Generally, the components 118, 120, 122, and 124 may be devices that perform some function that is more specialized than the functions performed by the nodes. For example, the components 118, 120, 122, and 124 may include memories, processors, input/output (I/O) devices such as ingress or egress ports, or any other electronic components. While the nodes 116 may comprise processors and/or memories, the capacity and/or throughput of the processors and/or memories in the components 118, 120, 122, and 124 typically greatly exceed those of the nodes 116 such that it would be not be possible or practical for the nodes 116 to perform the functions performed by the components 118, 120, 122, and 124. In cases where one of the components 118, 120, 122, and 124 is an ingress port, it may remove protocol layers from an incoming packet (e.g. an IP packet or Ethernet frame) and/or break the incoming packet into flits, if such is not done by the nodes 116. In cases where one of the components 118, 120, 122, and 124 is an egress port, it may reassemble the flits into an outgoing packet (e.g. an IP packet or Ethernet frame), and/or add protocol layers to the outgoing packet, if such is not done by the nodes 116.

The nodes in an on-chip network may be interconnected in different orders yielding a plurality of different ring networks having different topologies. FIGS. 2A, 2B, 2C, and 2D are schematic diagrams of embodiments of sixteen nodes interconnected in four different orders yielding four different ring networks. Four of the nodes are indicated as 210, 212, 214, and 216. FIGS. 2A-2D illustrate only four of the possible ways that the sixteen nodes may be interconnected as a bidirectional ring network. Note that FIGS. 2A-2C may be described as different orientations of a "U-shaped" ring network. That is, FIG. 2A may be described as an upside-down U shape, FIG. 2B may be described as a U shape, and FIG. 2C may be described as a sideways U shape. Further, FIG. 2D may be described as an "H shape." There may be other possible shapes for a sixteen node bidirectional ring network, such as a sideways H shape or a mirror-image sideways U shape.

A plurality of nodes may be interconnected as a first ring network using a first plurality of links, and may be interconnected as a second ring network using a second plurality of links. The nodes may be interconnected in different orders in first and second ring networks to form an asymmetric ring network. Interconnected in different orders may not mean interconnected in opposite directions. For example, two unidirectional networks connected to the same nodes in the same order but in opposite directions (i.e. a bidirectional ring network) may not be considered an asymmetric network. By way of further example, a schematic diagram of an embodiment of an asymmetric ring network 300 involving sixteen nodes is presented in FIG. 3. The asymmetric ring network 300 may be viewed as including two bidirectional ring networks—a first bidirectional ring network represented by the solid bidirectional links and a second bidirectional ring network represented by the dashed bidirectional links. The bidirectional ring network represented by the links with solid lines corresponds to the bidirectional ring network in FIG. 2A, and the bidirectional ring network represented by the links with dashed lines corresponds to the bidirectional ring network in FIG. 2B. Although shown in FIG. 3 as including two bidirectional ring networks, an asymmetric ring network is not limited to two bidirectional ring networks. An asymmetrical ring network may comprise any number of unidirectional and/or bidirectional ring networks. For example, the sixteen nodes in FIG. 3 may instead be interconnected as an asymmetric ring network with four ring networks, each of which is configured as in FIGS. 2A-2D, respectively. Further, an asymmetric ring network may include any number of nodes.

Each node in the embodiment of an asymmetric network 300 may comprise a processor and four routers, one for each of two directions of each of two bidirectional networks. The routers may be simple two-port routers used in unidirectional ring networks. For example, in node 210, there may be one two-port router for traffic received from node 212 and destined for node 214 (over the network represented by solid links), one two-port router for traffic received from node 214 and destined for node 212 (over the network represented by solid links), one two-port router for traffic received from node 214 and destined for node 216 (over the network represented by dashed links), and one two-port router for traffic received from node 216 and destined for node 214 (over the network represented by dashed links). Generally, for an asymmetric network with n bidirectional rings, each node may comprise a processor and 2n two-port routers. Alternatively, each node in a symmetric network 300 may comprise a processor and two routers. The routers may be four-port routers, with two input ports and two output ports for routing traffic in a bidirectional ring network. Generally, for an asymmetric network with n bidirectional rings, each node may comprise a processor and n four-port routers. In some cases, routers may also have a port to the processor at that node.

Figure 4:
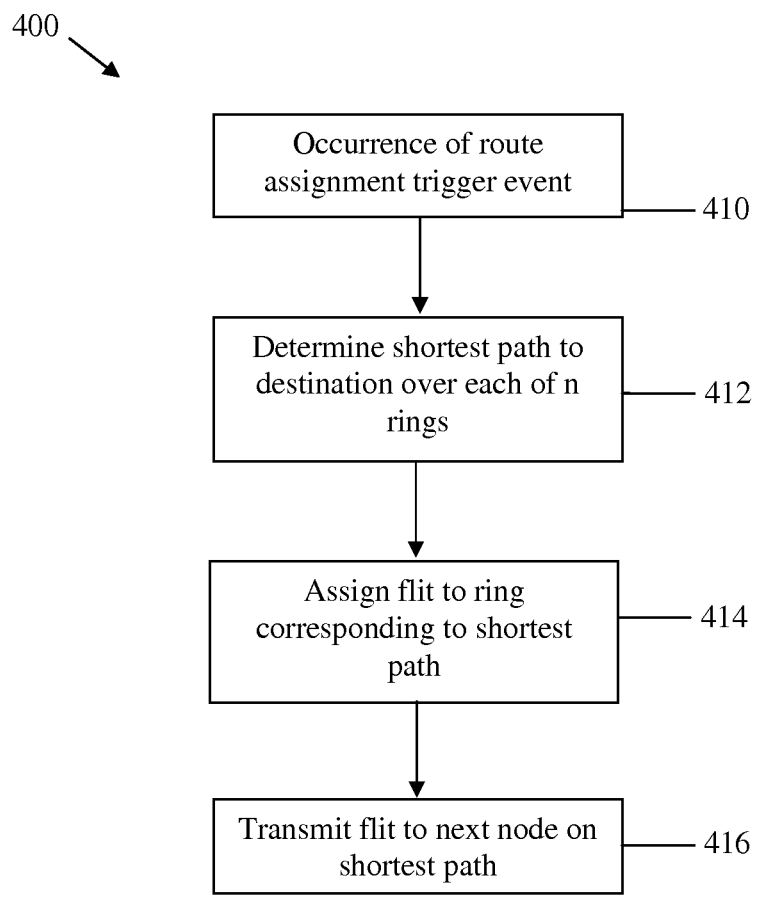
FIG. 4 is a flowchart of an embodiment of a flit routing method in an asymmetric ring network.

FIG. 4 shows a flowchart of an embodiment of flit routing method 400 in an asymmetric ring network. All of the steps may be carried out in a node in an on-chip network. The asymmetric ring network may comprise n unidirectional rings. One such implementation may be as n/2 bidirectional rings, if n is an even number. A route assignment trigger event occurs in step 410. A route assignment trigger event is an event that causes a flit to be assigned to one of the rings in an asymmetric ring network. A route assignment trigger event may be an entry of a flit into an on-chip network at a node, where an entry of a flit may be defined as a time in which a flit is received at an input port in a node in an on-chip network from a component in a SoC or a time in which a flit first enters a queue in a node in an on-chip network.

After the occurrence of route assignment trigger event in step 410, the shortest path to the destination node of the flit over each of the n rings is determined in step 412. For example, suppose a flit enters the asymmetric ring network 300 in FIG. 3 at node 214 and the flit is destined for node 216. There are four possible paths from any node to any other node, two paths for each of the two bidirectional rings. The length of the shortest path from node 214 to node 216 using the ring network represented by dashed links is two hops, whereas the length of the shortest path from node 214 to node 216 using the ring network represented by solid links is six hops. Thus, the shortest path from node 214 to node 216 is in the ring network represented by dashed links and is via node 210.

Next, in step 414 the flit is assigned to the ring corresponding to the shortest path. Using the example above from FIG. 3, the flit at node 214 is assigned to the bidirectional ring represented by dashed links. If the bidirectional ring is constructed using two unidirectional rings, the flit is further assigned to the unidirectional ring in the direction of node 210. Finally, in step 416 the flit is transmitted to the next node on the ring corresponding to the shortest path. Using the example above, the flit is transmitted from node 214 to node 210.

Once a flit has been assigned to a ring and transmitted over the ring, the steps in flowchart 400 may not need to be performed again for the flit at any other node as the flit traverses the network. Routing of the flit from one node to another may take place using simple two-port routers.

Figure 3:
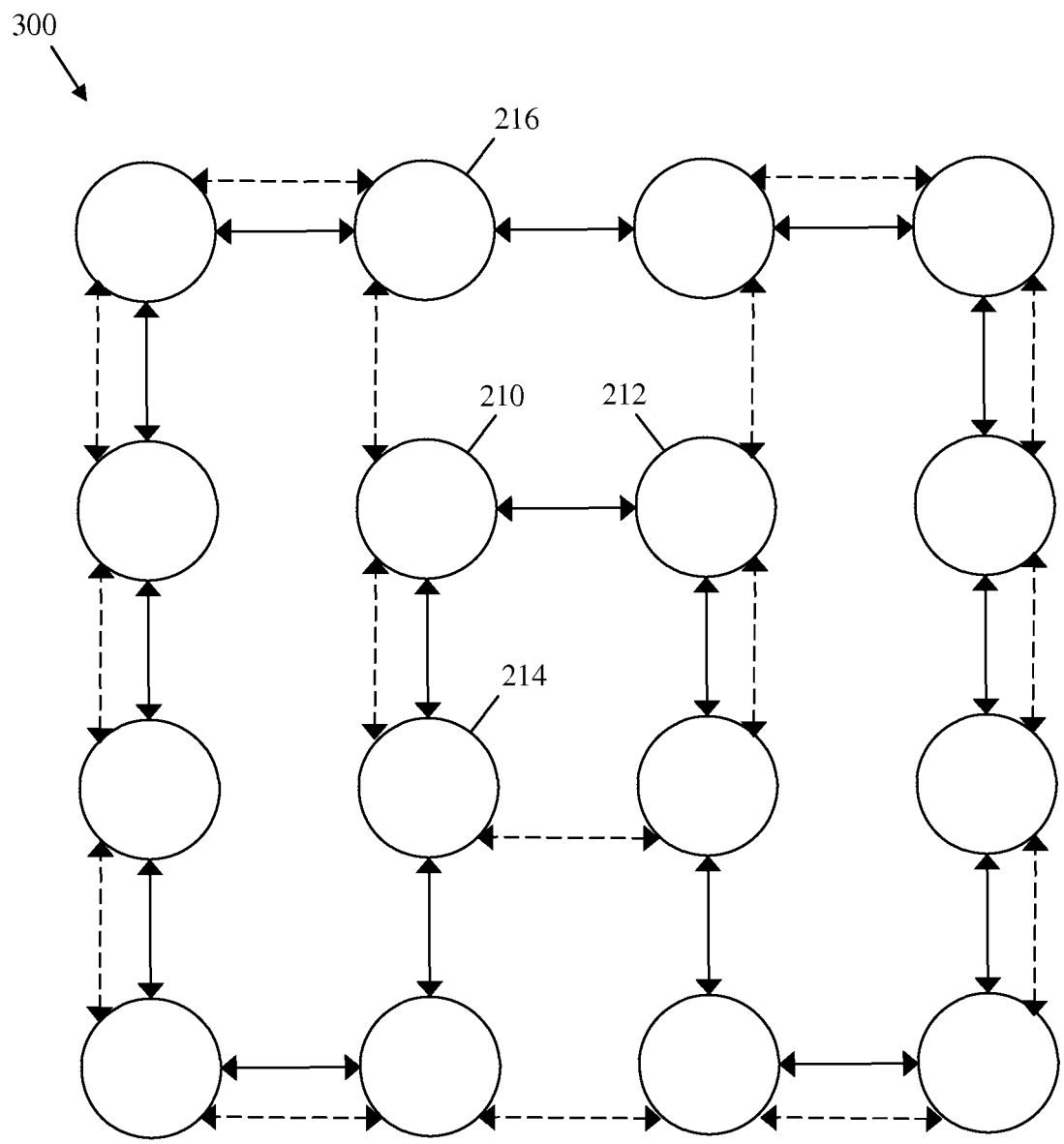
FIG. 3 is a schematic diagram of an embodiment of an asymmetric ring network.

Some advantages of asymmetric ring networks may be demonstrated by comparing latency and bandwidth against conventional ring networks as well as more complex mesh networks. A comparison of the "double U" asymmetric ring network of FIG. 3 against a single U network of FIG. 2A or 2B and against a mesh network is presented in Table 1. Note that a single U network may also be considered a conventional ring network. A mesh network in this context may be a network in which each of the sixteen nodes is connected via the bidirectional link to its neighbor to the north, south, east, and west. For example, if the sixteen nodes in FIG. 3 are connected in a mesh network, node 210 may be connected to nodes 216, 212, 214, and the unmarked node to the left of 210. One assumption for the table is that each bidirectional link is W bits wide in each direction. Another assumption is that shortest-path routing from source to destination is employed in each network. Shortest path routing may be accomplished in the asymmetric ring network by, for example, using the embodiment of flit routing method 400 in FIG. 4 as described previously. The bisection bandwidth may be a measure of system throughput and traditionally may be defined as the minimum number of unidirectional links that may be cut if a network is cut in half. Alternatively, the bisection bandwidth may be defined as the minimum bandwidth between two equal parts of a network.

TABLE 1

Comparison of asymmetric ring in FIG. 3 against other network topologies

|  | Single U (Conventional) | Double U | Mesh |
|---|---|---|---|
| Bisection Bandwidth | 8W | 8W | 8W |
| Average Latency | 5 | 4.0625 | 3.5 |
| Maximum Latency | 8 | 6 | 6 |

Referring to Table 1, while all the topologies may have the same bisection bandwidth, the double U network of FIG. 3 has substantially lower average and maximum latency compared with a conventional ring network. Further, the mesh network may have only a 14% lower average hop count than the double U network at the expense of significantly higher complexity. The double U network thus may offer a satisfactory tradeoff between performance and complexity.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. An apparatus comprising:
   a chip comprising:
      a plurality of nodes;
      a first plurality of links connecting the plurality of nodes in a first ring network having a first topology, wherein each of the first plurality of links is a bidirectional link; and
      a second plurality of links connecting the plurality of nodes in a second ring network having a second topology, wherein each of the second plurality of links is a bidirectional link,
   wherein the first topology is different than the second topology, and
   wherein each of the plurality of nodes comprises a first router coupled to the first ring network and a second router coupled to the second ring network.

2. The apparatus of claim 1, wherein each of the plurality of nodes is configured to construct a flit and to selectively transmit the flit over the first ring network or the second ring network.

3. The apparatus of claim 1, wherein a first node is directly connected to a second node via the first ring network, and wherein the first node is not directly connected to the second node via the second ring network.

4. An apparatus comprising:
   a chip comprising:
      a plurality of nodes;
      a first plurality of links connecting the plurality of nodes in a first ring network having a first topology;
      a second plurality of links connecting the plurality of nodes in a second ring network having a second topology different than the first topology; and
      a third plurality of links connecting the plurality of nodes in a third ring network having a third topology different than the first topology and the second topology.

5. The apparatus of claim 4, wherein each of the first, second, and third pluralities of links consists of bidirectional links, and wherein each of the plurality of nodes comprises a processor, a first router coupled to the first ring network, a second router coupled to the second ring network, and a third router coupled to the third ring network.

6. A method comprising:
   determining at a first node that a first ring network from among a plurality of ring networks interconnecting a plurality of nodes includes a shortest path from the first node to a second node; and
   transmitting a first flit from the first node to the second node over the first ring network, wherein the plurality of nodes includes the first node and the second node, and wherein the ring networks are asymmetric with respect to each other.

7. The method of claim 6, wherein each ring network from the plurality of ring networks includes all of the nodes in the plurality of nodes.

8. The method of claim 7, further comprising receiving at the first node a second flit, wherein the second flit is received from a third node via a second ring network from among the plurality of ring networks.

9. The method of claim 8, wherein the first node is directly connected to the third node via the second ring network, and wherein the first node is not directly connected to the third node via the first ring network.

10. The method of claim 9, further comprising:

receiving a packet at the first node from a component on a chip;

segmenting the packet into a plurality units of information; and placing one of the plurality of units of information into the first flit, wherein the chip comprises the plurality of nodes.

11. The method of claim 9, further comprising:

receiving the first flit at the first node from a component on a chip, wherein the component is a processor or a memory and not one of the plurality of nodes, and wherein the chip comprises the plurality of nodes.

12. An apparatus comprising:

a chip comprising:

a plurality of nodes;

a first plurality of links connecting the plurality of nodes in a first ring network; and a second plurality of links connecting the plurality of nodes in a second ring network, wherein a first node in the plurality of nodes is configured to:

determine which of the first ring network and the second ring network includes a shortest path from the first node to a second node; and selectively transmit a first flit over the first ring network or the second ring network based on the determination, wherein the first ring network and the second ring network form asymmetric ring networks.

13. The apparatus of claim 12, wherein each of the plurality of nodes is configured to construct a flit and to selectively inject the flit into the first ring network or the second ring network.

14. The apparatus of claim 13, wherein the chip further comprises a third plurality of links connecting the plurality of nodes in a third ring network, wherein the first ring network and the third ring network forms an asymmetric ring network, and wherein the second ring network and the third ring network forms an asymmetric ring network.

15. The apparatus of claim 14, wherein each of the plurality of nodes comprises a first router coupled to the first ring network, a second router coupled to the second ring network, and a third router coupled to the third ring network.

16. The apparatus of claim 15, wherein the first node is directly connected to a third node via the first ring network, and wherein the first node is not directly connected to the third node via the second ring network.

17. The apparatus of claim 13, wherein the first ring network is a U-shaped ring network, and wherein the second ring network is one of a sideways U-shaped ring network or an H-shaped ring network.

18. The apparatus of claim 17, wherein the plurality of nodes consists of sixteen nodes, and wherein the first and second ring networks are configured such that a maximum latency and a bisection bandwidth are the same as for a sixteen-node mesh network.

* * * * *